United States Patent [19]

Ito et al.

[11] 4,032,933
[45] June 28, 1977

[54] INDICATION SYSTEM OF A CAMERA

[75] Inventors: Tadashi Ito, Kanagawa; Masanori Uchidoi, Kawasaki; Tetsuya Taguchi, Kawasaki; Tokuichi Tunekawa, Kanagawa; Hiroshi Aizawa; Yoshiyuki Takishima, both of Machida, all of Japan

[73] Assignee: Canon Kabushiki Kaisha, Tokyo, Japan

[22] Filed: Mar. 3, 1975

[21] Appl. No.: 554,901

[30] Foreign Application Priority Data

| Mar. 4, 1974 | Japan | 49-25558 |
| Mar. 4, 1974 | Japan | 49-25559 |
| Mar. 20, 1974 | Japan | 49-31805 |
| Mar. 20, 1974 | Japan | 49-31806 |

[52] U.S. Cl. .............. 354/23 D; 354/51; 354/53; 354/60 A; 354/60 L
[51] Int. Cl.² .......................... G03B 17/20
[58] Field of Search ........... 354/53, 60 R, 60 A, 354/60 L, 23 D, 50, 51; 340/324 R, 324 M; 235/92 R, 92 MB

[56] References Cited

UNITED STATES PATENTS

| 3,738,099 | 6/1973 | Tanaka | 340/324 M |
| 3,818,495 | 6/1974 | Sagara et al. | 354/53 |
| 3,876,876 | 4/1975 | Kitai et al. | 354/23 D |
| 3,879,723 | 4/1975 | Hornung | 340/324 R |
| 3,895,875 | 7/1975 | Kitaura et al. | 354/53 |
| 3,909,137 | 9/1975 | Kisanuki | 354/60 L |

OTHER PUBLICATIONS

IBM Technical Disclosure Bulletin, vol. 6, No. 12, May 1964, pp. 17 & 18.

Primary Examiner—Russell E. Adams
Attorney, Agent, or Firm—Toren, McGeady and Stanger

[57] ABSTRACT

A camera having an indication system to determine suitable diaphragm aperture value by measuring the light penetrating through a photographing lens and to indicate the same digitally, wherein when said diaphragm aperture value exceeds the limit value of exposure control of a camera, a warning indication is given by the indication means to indicate the fact that the diaphragm aperture value is outside of control limit, and the number of input/output lead wires to the indication means is reduced. Thus simplifying the set-up.

4 Claims, 14 Drawing Figures

FIG.3
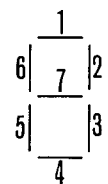
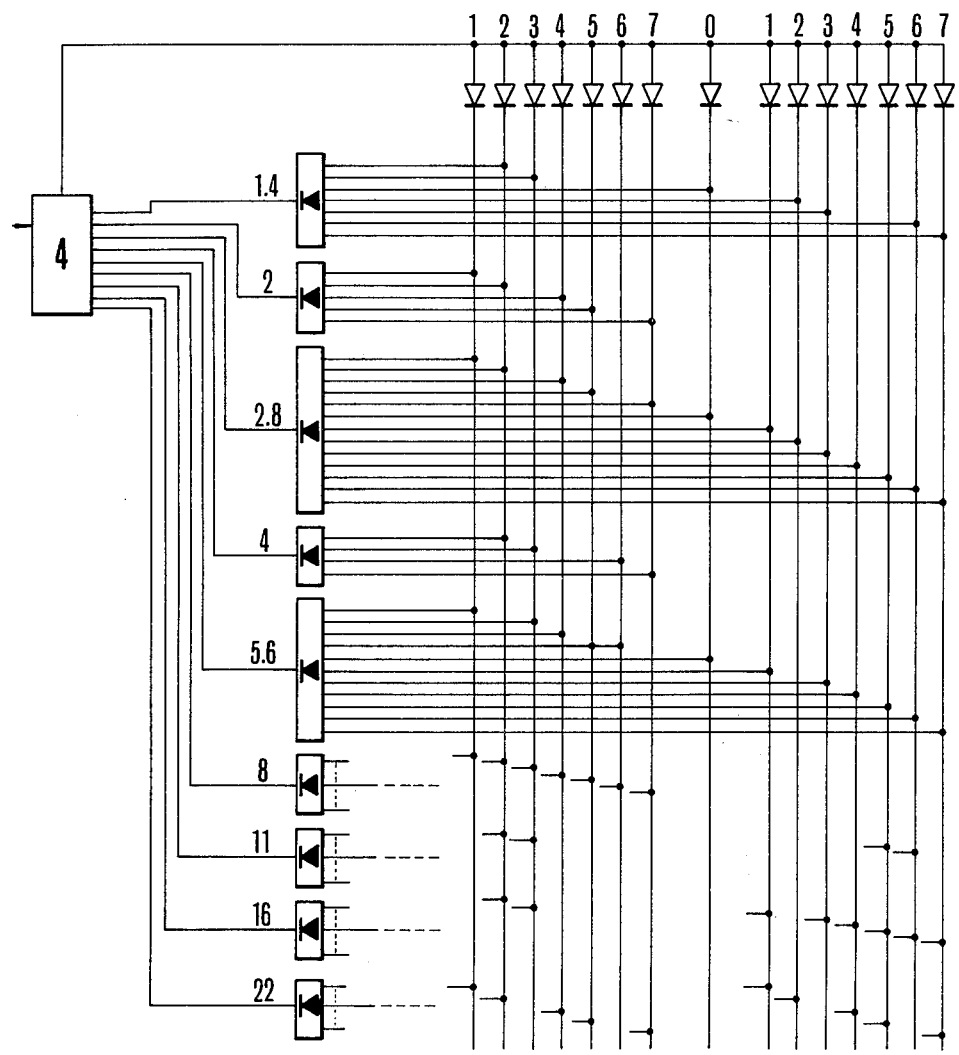

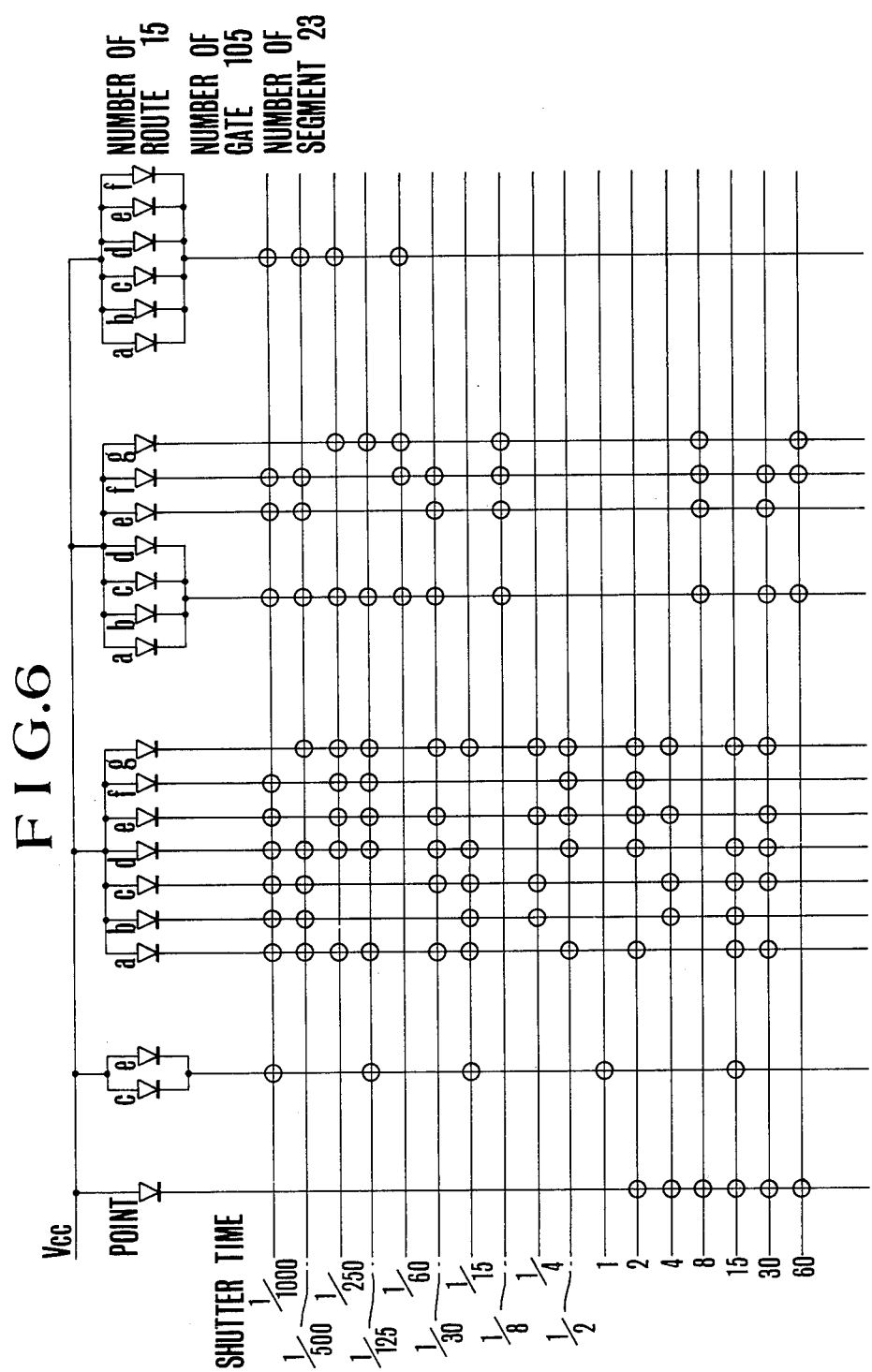

FIG.7

| SHUTTER TIME | display |
|---|---|
| 1/1000 | 1000 |
| 1/500 | 500 |
| 1/250 | 250 |
| 1/125 | 125 |
| 1/60 | 60 |
| 1/30 | 30 |
| 1/15 | 15 |
| 1/8 | 8 |
| 1/4 | 4 |
| 1/2 | 2 |
| 1 | 1 |

| SHUTTER TIME | POINT | display |
|---|---|---|
| 2 | ○ | 2 |
| 4 | ○ | 4 |
| 8 | ○ | 8 |
| 15 | ○ | 15 |
| 30 | ○ | 30 |
| 60 | ○ | 60 |

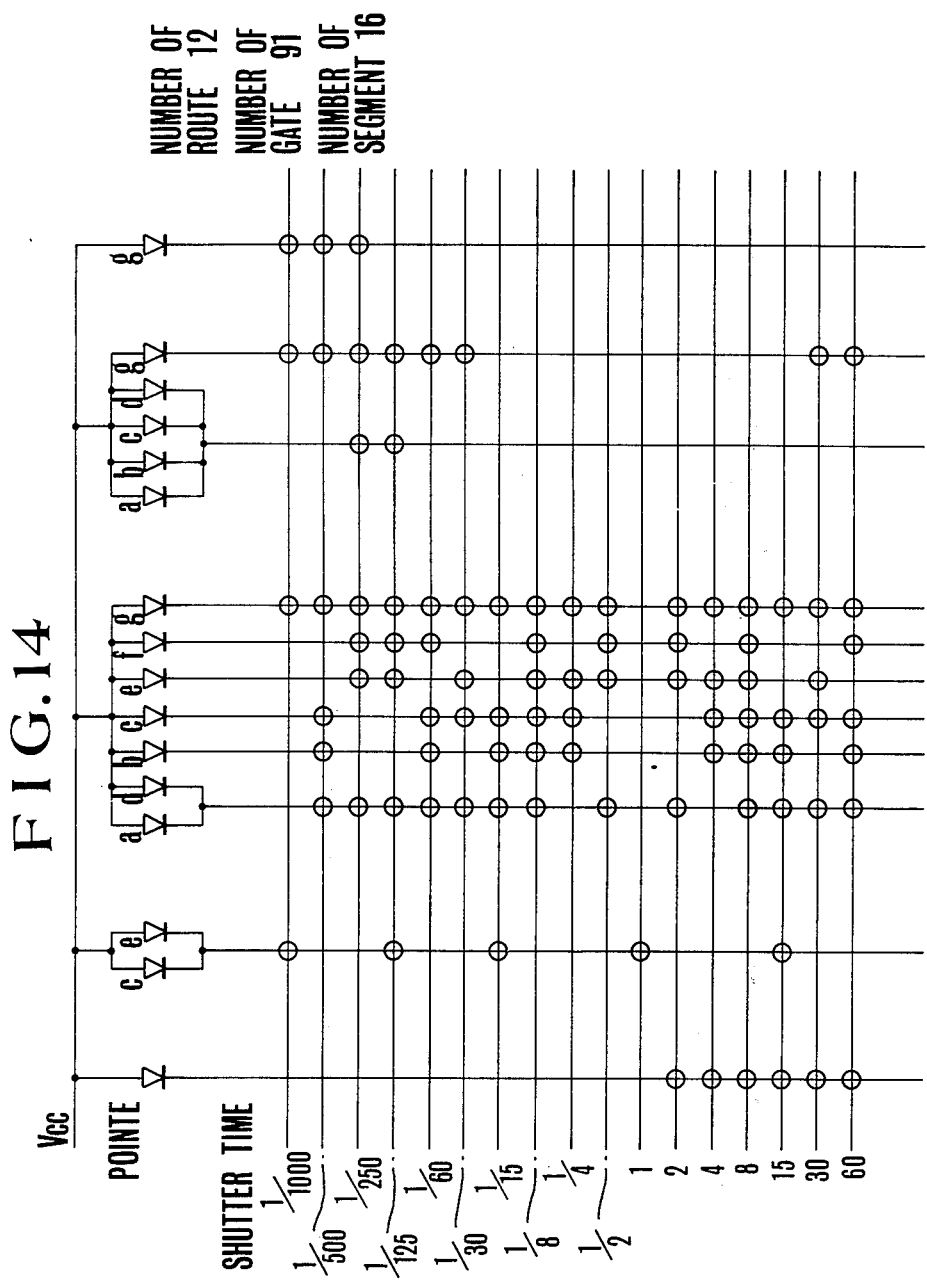

INDICATION SYSTEM OF A CAMERA

BACKGROUND OF THE INVENTION

1. Field of the Invention

The present invention relates to an indication system of a camera to indicate photographing information by a plural number of indication elements.

2. Description of the Prior Art

It has recently become known how to indicate such photographing information as shutter time and diaphragm aperture value, etc. within a finder of a camera. However, when an indication device to indicate letters and marks, etc. by seven-segment elements, etc. is provided near a finder of a camera, indication elements with multiple figures will be required and a number of lead wires will be required therefor. It is difficult to mount them near a finder which has limited space, and it is desired that the number of input/output lead wires to indication elements and the number of indication elements be made as small as possible.

In an AE camera in which an object brightness is measured by a photoelectric conversion element, to automatically determine exposure value, when the object brightness is too dark or too bright and falls outside of the exposure control limit of a camera, an indication device to provide warning therefor is necessary, thus various types of warning devices have been proposed. In a camera to digitally indicate photographing information by a lamp, such method has been used conventionally as will indicate the fact that diaphragm aperture value or shutter time is outside of the serviceable limit by lighting an over-flow lamp, etc.

In such method, a luminous element for warning needs to be provided beside indication elements and thus it is disadvantageous to install the same in a camera having limited space.

SUMMARY OF THE INVENTION

A first object of the present invention is to eliminate said disadvantages and to eliminate the necessity to provide separately an indication element for warning indication by providing the warning of outside-the-exposure-control-limit of a camera by flickering, putting light out, dimming light, etc. of an indication elements for photographing information indication.

A second object of the present invention is to connect indication elements (segments) which are placed in conductive state or non-conductive state all together, thereby making it convenient to install the device within a finder, etc., by reducing the number of input/output lead wires to an indication device.

A third object of the present invention will become apparent by examples to be described below.

BRIEF DESCRIPTION OF THE DRAWINGS

FIG. 3 is an indication circuit diagram for a diaphragm aperture value used in the circuit of FIG. 2.

FIG. 6 is a diagram to show second example of a shutter time indication circuit.

FIG. 7 is a drawing to show the indications by the circuit of FIG. 6.

FIG. 14 is a diagram to show sixth example of a shutter time indication circuit.

DESCRIPTION OF THE PREFERRED EMBODIMENTS

Figure 1:
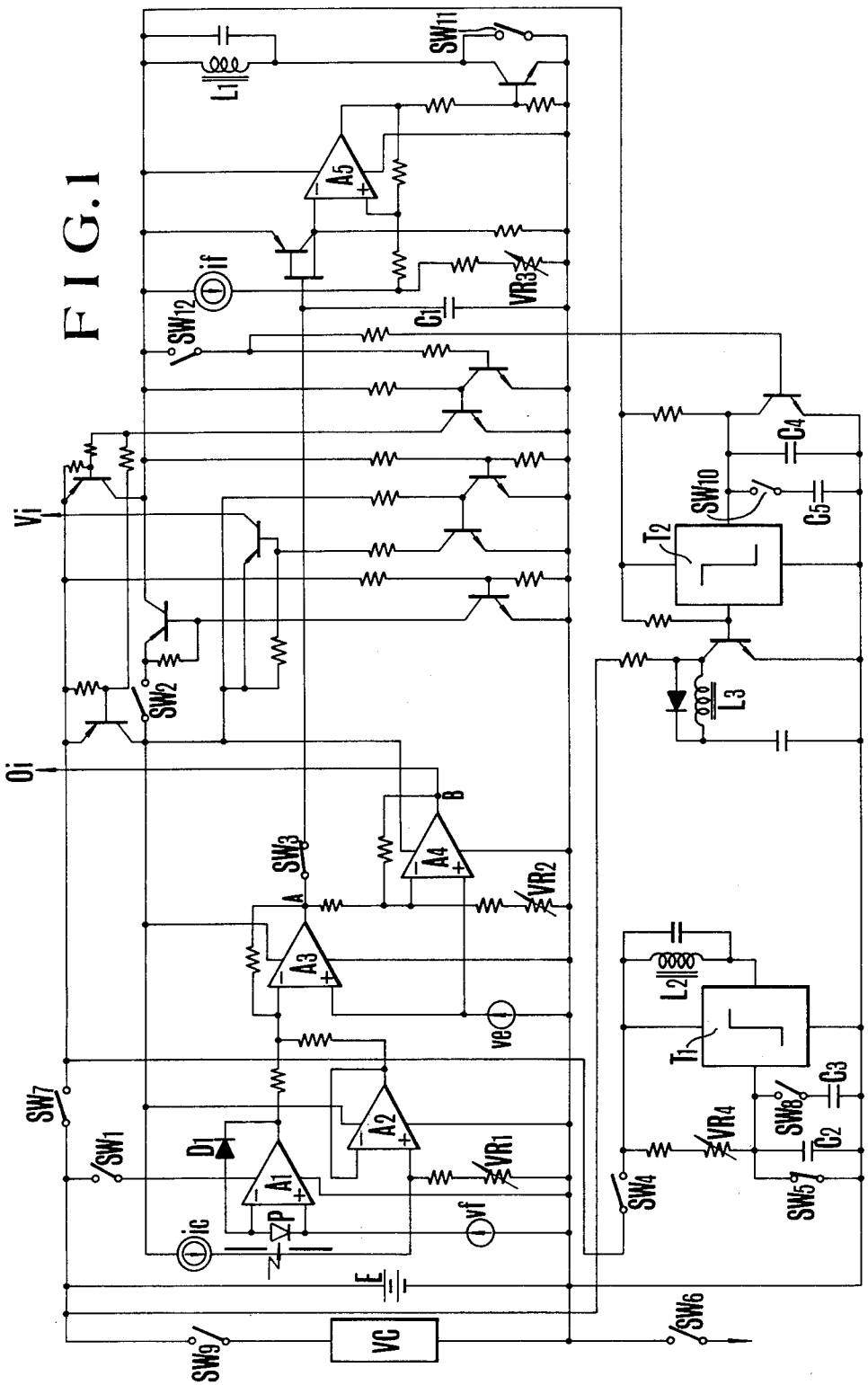
FIG. 1 pertains to an example of the present invention and is an automatic exposure control circuit diagram of a shutter preference camera employing an indication system.

FIG. 1 shows a control circuit of a shutter preference automatic exposure control camera, and in this diagram P is a light receiving element, for example, a silicon blue cell, etc., to receive the light penetrating through a photographing lens. $A_1$ is an amplifier (for example, an operation amplifier) of a light-measuring circuit, wherein a log. diode $D_1$ is connected to the feed back path of the same so that a logarithmically compressed output can be obtained.

$A_2$ is an amplifier of a photographing information setting circuit, and film sensitivity and shutter time values are set at a variable resistor $VR_1$ connected to the input of said amplifier, wherein the output of $A_2$ is synthesized with the output of $A_1$ and is supplied to an amplifier $A_3$ of an operation circuit. Each of the photographing information is operated at the amplifier $A_3$ and a diaphragm aperture information is obtained at the output thereof. Said diaphragm aperture information is lead to a capacitor $C_1$ through a memory switch $SW_3$, and memory is made by charging $C_1$. The voltage of $C_1$ is retained even if $SW_3$ becomes OFF after the memory is made and it is supplied to an amplifier $A_5$ of a diaphragm aperture determining circuit. When a variable resistor $VR_3$, which is linked with the diaphragm, varies under said state and the input diaphragm aperture information into $A_5$ coincides with the voltage for $VR_3$, a magnet $L_1$ is activated by the output from $A_5$ and diaphragm aperture value is determined. When a shutter button is operated state, the diaphragm is stopped down to said determined value, and photographing will be done with such shutter time as has been set at $VR_1$ beforehand.

Next, explanation will be made of the function of said camera. By a first step action of a shutter release, the switch $SW_1$ becomes ON, and voltage from a power source E is impressed onto a light measuring circuit, an information setting circuit and an operation circuit to place them in an operative state. By this diaphragm aperture step, a signal is generated at an output terminal A of the amplifier $A_3$ and is memorized at the memory capacitor $C_1$ through the switch $SW_3$. The step signal at the point A is supplied to an amplifier $A_4$ of a fully-opened F-value correction circuit and is synthesized with the voltage of a variable resistor $VR_2$ which is linked with the fully-opened F-value of a photographing lens and has such resistance value as corresponds therewith, and such signal as corresponds to an absolute diaphragm aperture value having the fully-opened F-value corrected is provide at an output terminal B of $A_4$, and these are introduced into an indication circuit to be described later from a terminal $Oi$. An indication voltage $Vi$ is impressed onto the indication circuit as shown in the drawing, and the analog diaphragm aperture information from $Oi$ is AD converted; then signal illuminating indication is performed by seven-segment illuminant element, etc. Said indication becomes such F-value as is the absolute diaphragm aperture value, having the output of the operation circuit corrected with the fully-opened F-value of a lens used and the lens is actually stopped down to the same in photographing. Next by the second action of a release button, a diaphragm determining circuit and a self photographing clamping circuit are placed in an operative state and diaphragm aperture value is determined in a manner mentioned above.

In a case of ordinary photographing, $SW_{10}$ becomes OFF so that the time constant of a timer clamping circuit becomes extremely short, and a timing circuit $T_2$ of the clamping circuit is immediately inversed and a switch $SW_4$ of the shutter time circuit becomes ON by a magnet $L_3$.

As $SW_5$ is made OFF by the mirror being up, a capacitor $C_2$ (or $C_2$ and $C_3$) is charged through a variable resistor $VR_4$ which has been set beforehand in association with a shutter time dial and as it reaches an inversing voltage of the timing circuit $T_1$, the running of a shutter rear screen is done by a magnet $L_2$. When a self timer is used, $SW_{10}$ becomes ON and, after such delay time as is as much as the time constant of a self timer, the switch $SW_4$ of a shutter time circuit becomes ON.

In the drawing, VC is a battery checker circuit and $SW_9$ is its switch, while ic, if, are constant current sources and Ve, Vf are constant voltage sources.

Next, explanations will be made of a case when stopped down light measuring in the present invention is done in a camera shown in the drawing. In this case also, film sensitivity and shutter time are set at $VR_1$ and the light from an object is received by P through a photographing lens. As stop down proceeds by operating a diaphragm mechanism of lens, the voltage at the point A in the drawing varies. By this, the fully-opened F-value is set at $VR_2$ and the signal at the point B which is corrected through $A_4$ also varies, while the F-value indication of a diaphragm aperture value indication device also varies. Now, for example, if an object brightness is 7 in Bv value, and photographing is done with film sensitivity of ASA 100 and shutter time of 1/125 second using a lens with fully-opened F-value of F 1.4. When each photographing information is expressed with Appex value, Bv is 7, Sv is 5, Tv is 7, while fully opened F-value will be Av 1.

$$Bv = Av + Tv - Sv \qquad (1)$$

From the above relationship the value of Av to provide appropriate exposure will be $Av = 5$ substituting each of above mentioned values for each term in the above equation.

That is, appropriate exposure is obtained when a lens with Av 1 is stopped down to Av 5 (F 5.6). When the lens is stopped down to Av 5, the voltage at the point A in the circuit shown in the diagram will become such voltage as corresponds to Av 0, and it is corrected to Av 1 in a fully-opened F-value correction circuit and is provided at the terminal $Oi$. Therefore, the indication device is to indicate Av 1, that is, the fully opened F-value of a lens used, and such state will become the indication at the time of appropriate exposure when a lens with F 1.4 (Av 1) is stopped down by stopped down light measuring. Similarly, when a photographing lens with fully-opened F-value of F 2.8 (Av 3) is used, and the point A becomes Av0, the indication will be Av 3, therefore, appropriate exposure is obtained when the fully-opened F-value of F 2.8 of a lens is illuminatedly indicated.

Next, the fully opened F-value signal can not be obtained from a photographing lens, the $VR_2$ of the fully-opened F-value correction circuit in the drawing will become in the reset state, therefore the voltage at the point A when appropriate exposure is obtained by stopping down the lens, that is the signal of Av 0 will be directly outputted at the terminal $Oi$. Therefore the F-value indication of the indication device will indicate Av 0 that is F 1. As this indication of F 1 will have constant value irrespective of the fully-opened F-value of a photographing lens, appropriate exposure will be obtained when this reference F-value is indicated. That is, a lens should be so stopped that the indication will show the reference value F 1. In a case of a lens in which fully-opened F-value signal is obtained, when a means to reset the above mentioned $Vr_2$ in a stopped down light-measuring is provided appropriate exposure value is obtained by an indication of reference F-value.

While such indication of appropriate exposure as mentioned above in stopped down light measuring can be illumination of fully opened F-value or reference F-value of lens only, in order to make it more clear, the illumination of said indications may be so made as flickered with suitable cycle. Also it is possible to put out the light of the indication in this case to make the indication of stopped down light-measuring.

Figure 2:
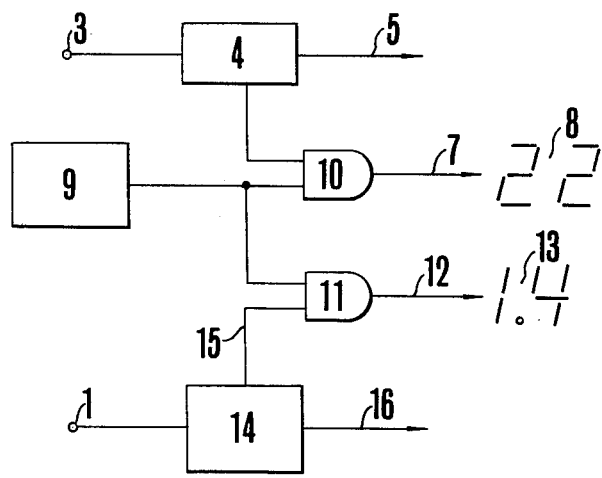
FIG. 2 is a circuit diagram to detect the exposure control limit used in the circuit of FIG. 1.
Figure 5:
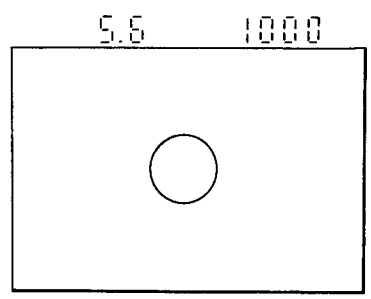
FIG. 5 is a drawing to show a state in which diaphragm aperture value and shutter time are indicated at a finder.

FIG. 2 is a circuit diagram for detecting the exposure control limit, wherein $Oi$ signal of the circuit in FIG. 1 is supplied to a terminal 3. This signal is an analog signal and it is converted into digital signal 5 using an AD conversion circuit 4 to indicate it in a digital indication device. The AD converted digital signal drives, for example, seven-segment illuminant element by a decoder driver as will be mentioned below, and such diaphragm aperture value as corresponding to input diaphragm aperture information is indicated. When this indication becomes the limit values of diaphragm aperture value, for example F 22, F 1.4, flickering is made by intermittently putting on and off the output signal of AD conversion circuit with the output of a signal oscillator. When an object brightness is too bright and exceeds the upper limit of diaphragm under a preset shutter time, that is, as the output of the AD conversion circuit 4 reaches the upper limit value F 22 of diaphragm, this output is outputted from 4 and inputted into AND circuit 10. And the output from an oscillator 9 with suitable cycle is supplied to one end of the AND circuit 10, where AND is removed and output is made and an indication 8 of F 22 of an indication circuit is flickered with a cycle of the oscillator 9. Also diaphragm aperture information is supplied from the point A of circuit in FIG. 1 into a terminal 1 in the drawing. For example, first level 15 and second level 16 are detected by a low warning level detection circuit 14 consisting of a two step Schmidt circuit. First lever 15 is a signal near the fully-opened F-value of a photographing lens used and it is inputted into one end of the AND circuit 11 and is AND gated as a signal from the oscillator 9. As a result a diaphragm aperture indication signal 13 near fully opened F-value is obtained as the output of the AND circuit 11, and thereby diaphragm aperture indication is flickered. The signal of second level 16 is detected as the diaphragm aperture information is far lower than the signal of the first level 15, and a separately provided indication or a limit (value) F-value indication is light-outed or light dimmed by the output thereof to give warning for the lower limit.

FIG. 3 shows a diaphragm aperture value indication circuit, wherein 4 is an AD conversion circuit shown in FIG. 2. This AD conversion circuit 4 consists of a 9 step Schmidt circuit and the output of said Schmidt circuit with 9 steps will be diaphragm aperture value F 1.4 to F 22. That is, when a certain level of diaphragm aperture value is inputted into the AD conversion circuit 4, such Schmidt circuit as corresponding to said input level is inversed and signal of "1" is generated as the output thereof. For example, if the diaphragm aperture value is at such level as corresponding to F 5.6, the output terminal of F 5.6 in the drawing becomes 1, and it is combined with seven segment indication element by way of its associated diode block a diode array and is statically driven. In case of 5.6, in the first figure, 1, 3, 4, 6 has power conducted therethrough, and an indication of "5" is done. Also power is conducted to an element to indicate a decimal point, then in the second figure 1, 3, 4, 5, 6, 7 has power conducted therethrough and an indication of "6" will be done. By this F-value indication of "5.6" will be done within a finder. And each indication element is consolidated for each leter of F-value indication value, respectively, through a diode, and the number of input lead wires to the indication device can be 9, that is the number of digits. Thus, adding one output lead thereto, a total of 10 input/output lead wires to the indication device suffices.

Figure 4:
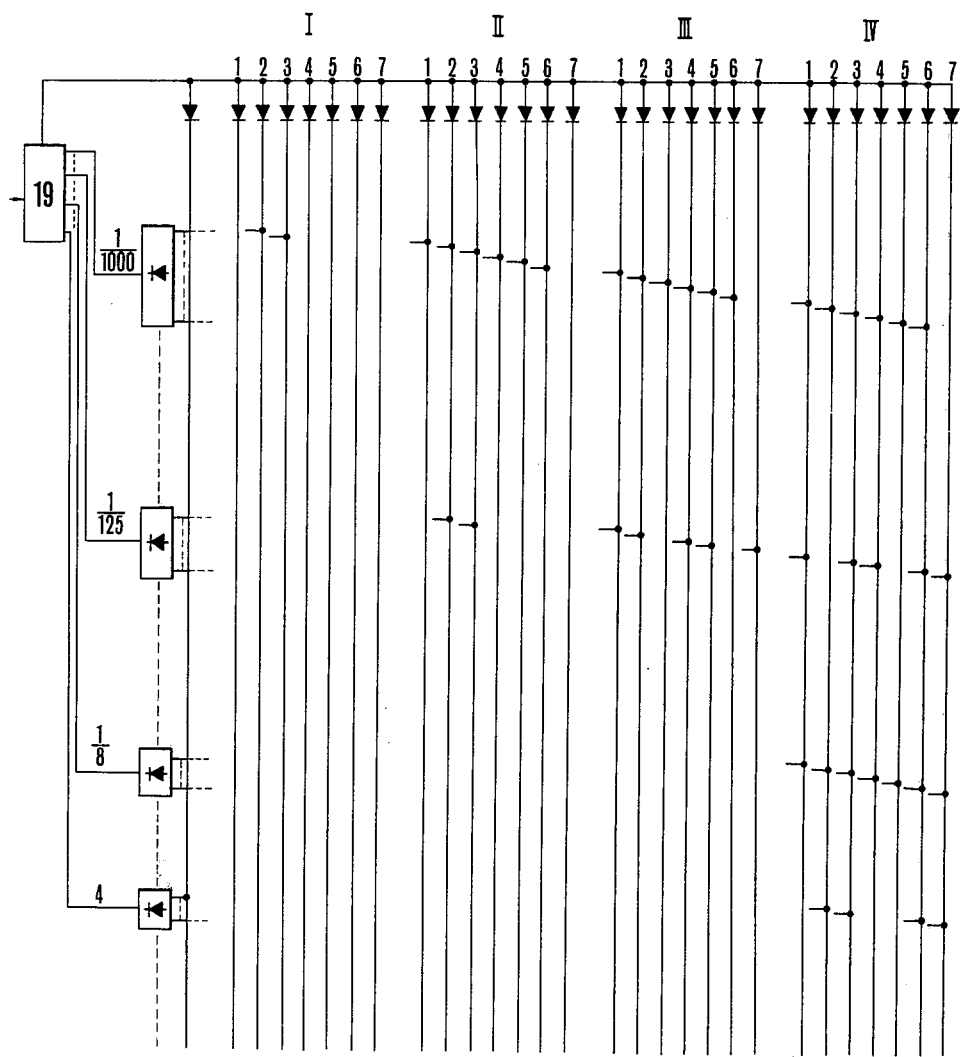
FIG. 4 is a diagram to show a first example of a shutter time indication circuit used in the circuit of FIG. 1.

FIG. 4 shows first example of an indication circuit to make indication of shutter time, indicating multiple series shutter time from 1/1000 second to 60 seconds using seven-segment indication element with 4 figures, 19 is an AD conversion circuit for converting a set shutter time information to digital amount, and the input to such indication element LED as corresponding to one indication value of shutter time is consolidated by a diode block and made into one input lead. For example, to indicate 1/1000 second, for the first figure, elements 3, 4 emit light to indicate 1, while for 2nd, 3rd and 4th figures, elements 1, 2, 3, 4, 5, 6 emit light to indicate 0. By this, indication of 1000 can be obtained. For indicating long time as 2 seconds or longer, 0 indication is added to the indication to distinguish such long time indication from the indication of ½ second or shorter.

The above mentioned diaphragm aperture value indication and shutter time indication are made outside of a field of vision of a camera finder as shown in FIG. 4.

FIG. 6 shows, second example of an indication circuit to indicate shutter time, wherein the indication elements for the first figure are limited to c and e only which can show 1 only. For the 2nd figure, each of elements a to g is separately connected to a matrix circuit respectively. For the 3rd figure the elements, a, b, c, d are consolidatedly connected in parallel, being connected to a matrix circuit with one lead wire. This is because the digits indicated for this figure are limited to 5, 6, 8.

For the 4th figure, as 0 only may be indicated in this example, the elements a to f are consolidatedly connected in parallel, being connected to a matrix circuit with one lead wire.

The element g is not provided here. When the above mentioned circuit connection is used, the number of input/output lead wires to the indication part will be one input lead of Vcc and the 14 output leads from the elements, thus a total of 15 leads. Also the number of segment elements will be 23 and the number of gates consisting the matrix will be 105, thus the circuit arrangement of an indication device can be simplified. In the indications by this circuit, the indication positions for 60 and 8 are out of line as shown in FIG. 7, while other numbers are indicated at normal positions. For indication of long time as 2 seconds or longer, the indication of 0 can be made on the head of the digits.

Figure 8:
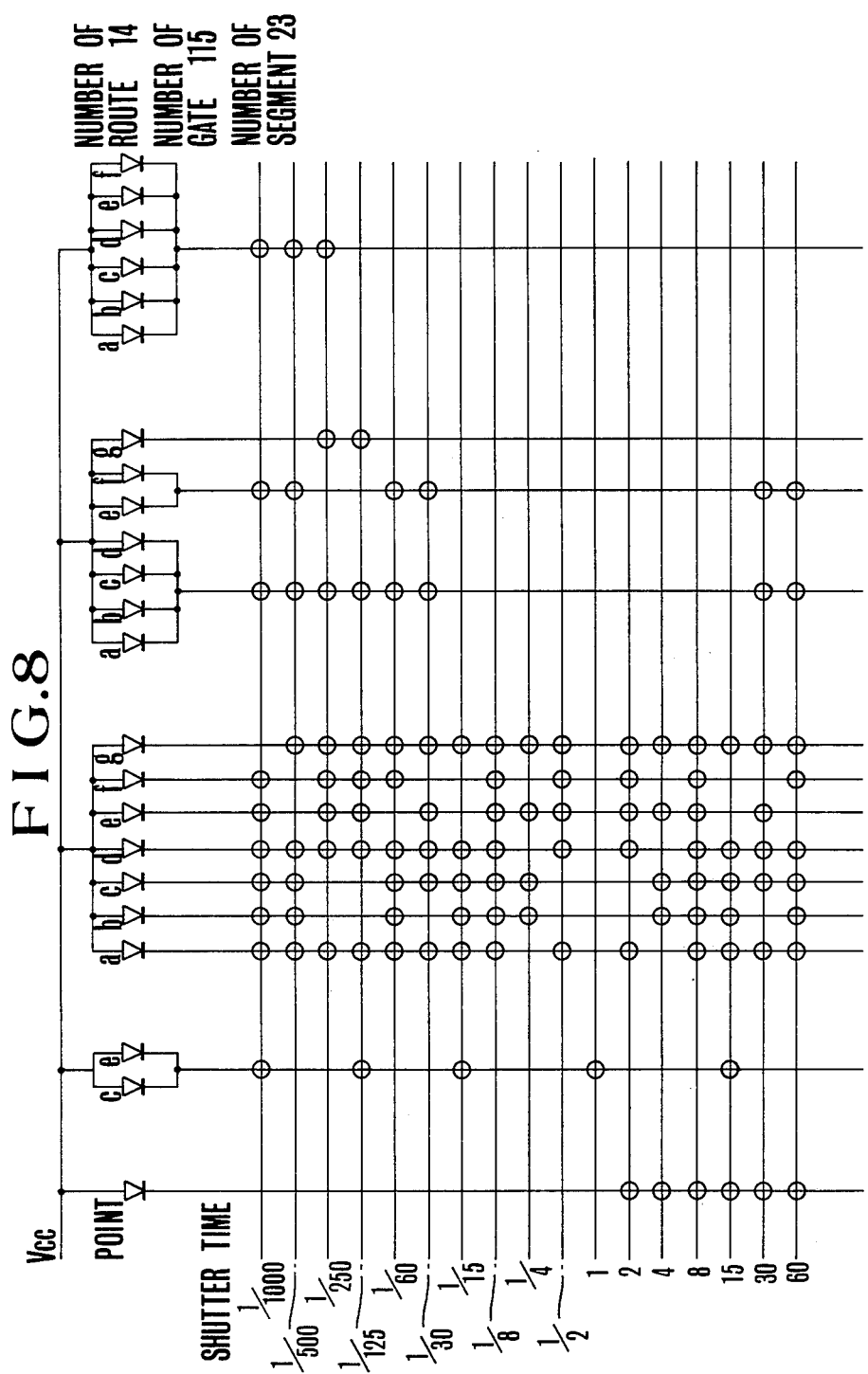
FIG. 8 is a diagram to show third example of a shutter time indication circuit.
Figure 9:
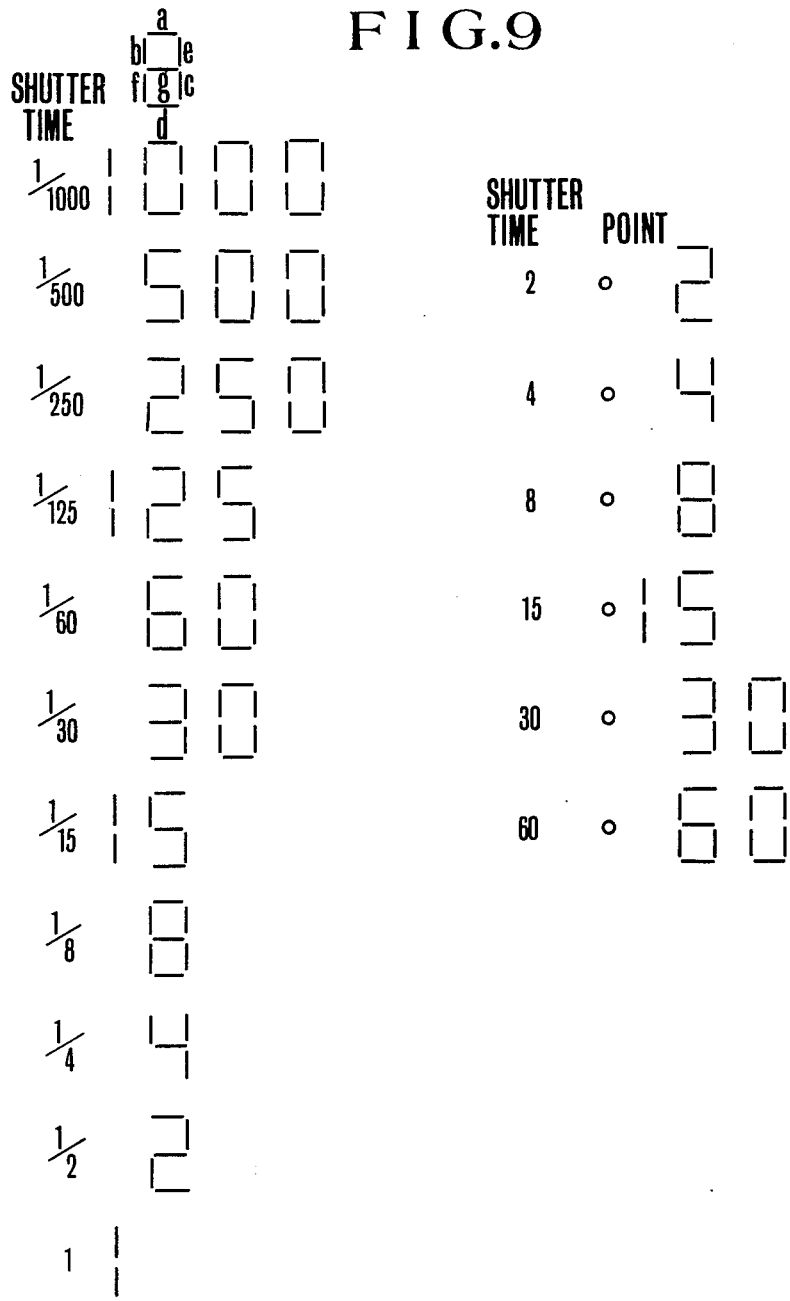
FIG. 9 is a drawing to show the indications by the circuit of FIG. 8.
Figure 10:
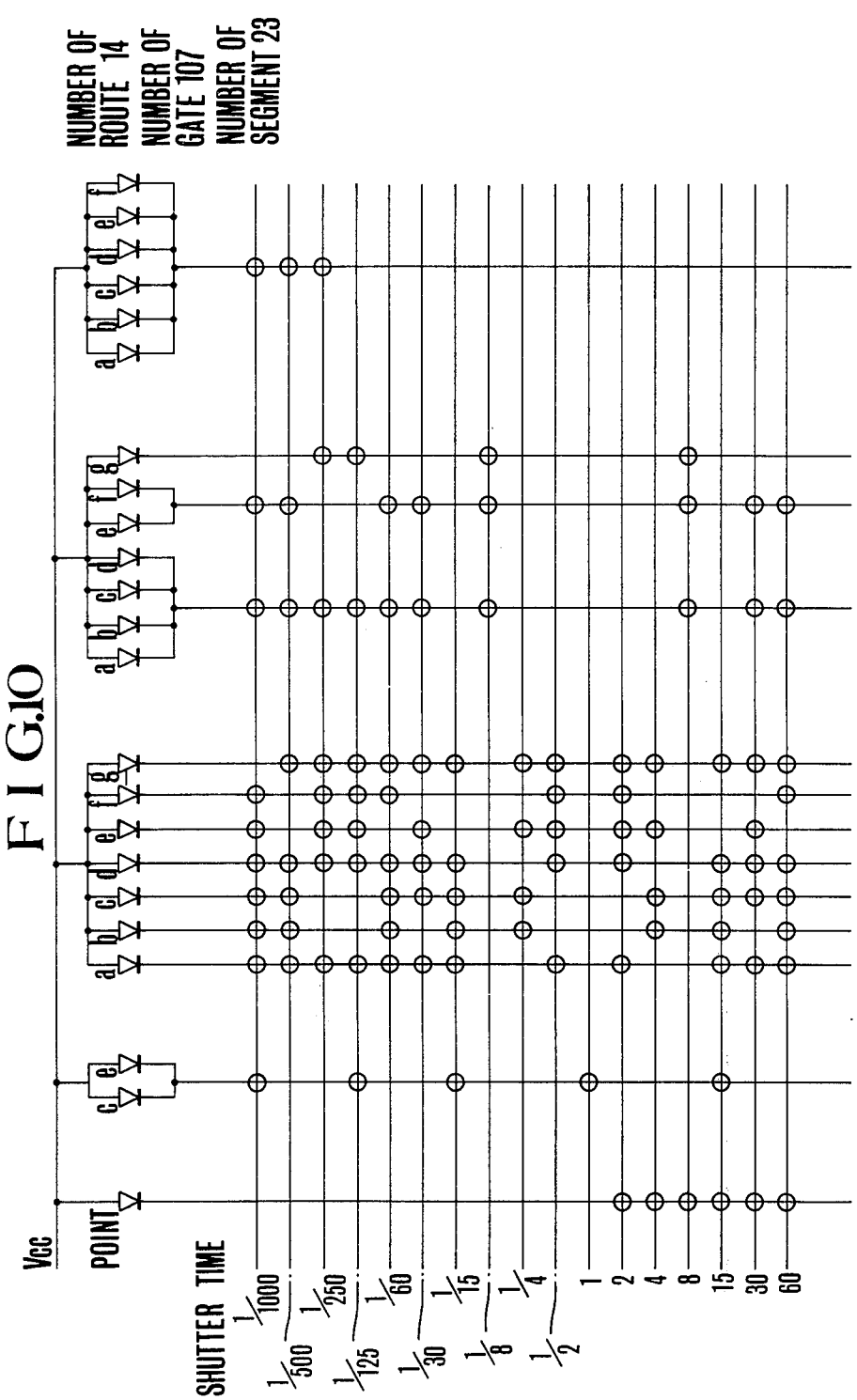
FIG. 10 is a diagram to show fourth example of a shutter time indication circuit.
Figure 11:
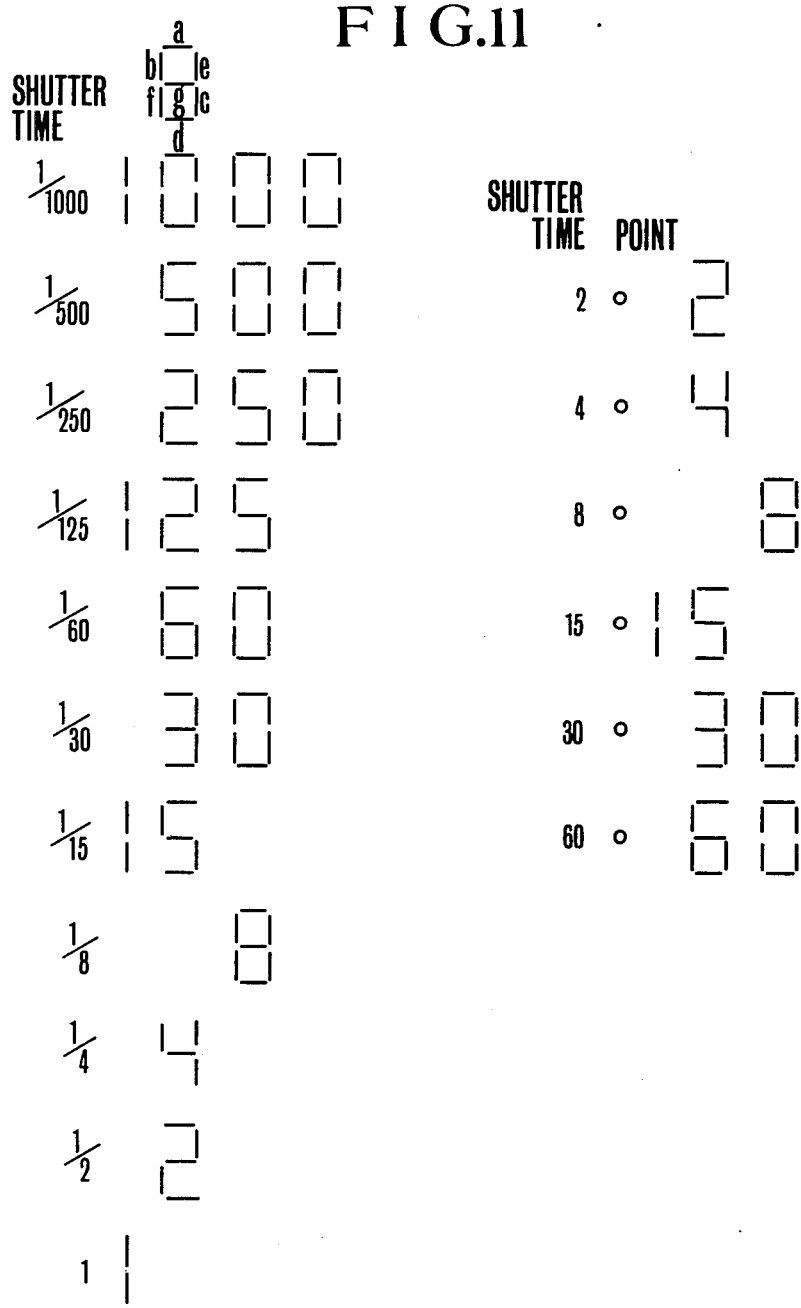
FIG. 11 is a drawing to show the indications by the circuit of FIG. 10.

In the third example shown in FIG. 8 for the third figure, indication elements a, b, c, d and the elements e, f are consolidated into two groups to indicate 0 and 5 only in this figure, and FIG. 9 shows the indications thereof. As shown in the drawing the first figure indicates 1 only, and the second figure indicates first digit of numbers except 1, while for other figures indications resemble to those in FIG. 6. In this example, the number of input/output lead wires to the indication elements is 14, the number of segment elements is 23, while the number of matrix gates is 115. In a fourth example shown in FIG. 10, only the position of "8" in FIG. 8 is shifted to the third figure as in the indication drawing shown in FIG. 11, and while the combination of segment elements is the same as in the example of FIG. 8, the arrangement of the matrix gate is varied. By this in this example, the number of input/output lead wires is 14, and the number of segments is 23, being same as that in FIG. 4, while the number of gates is reduced to 107.

Figure 12:
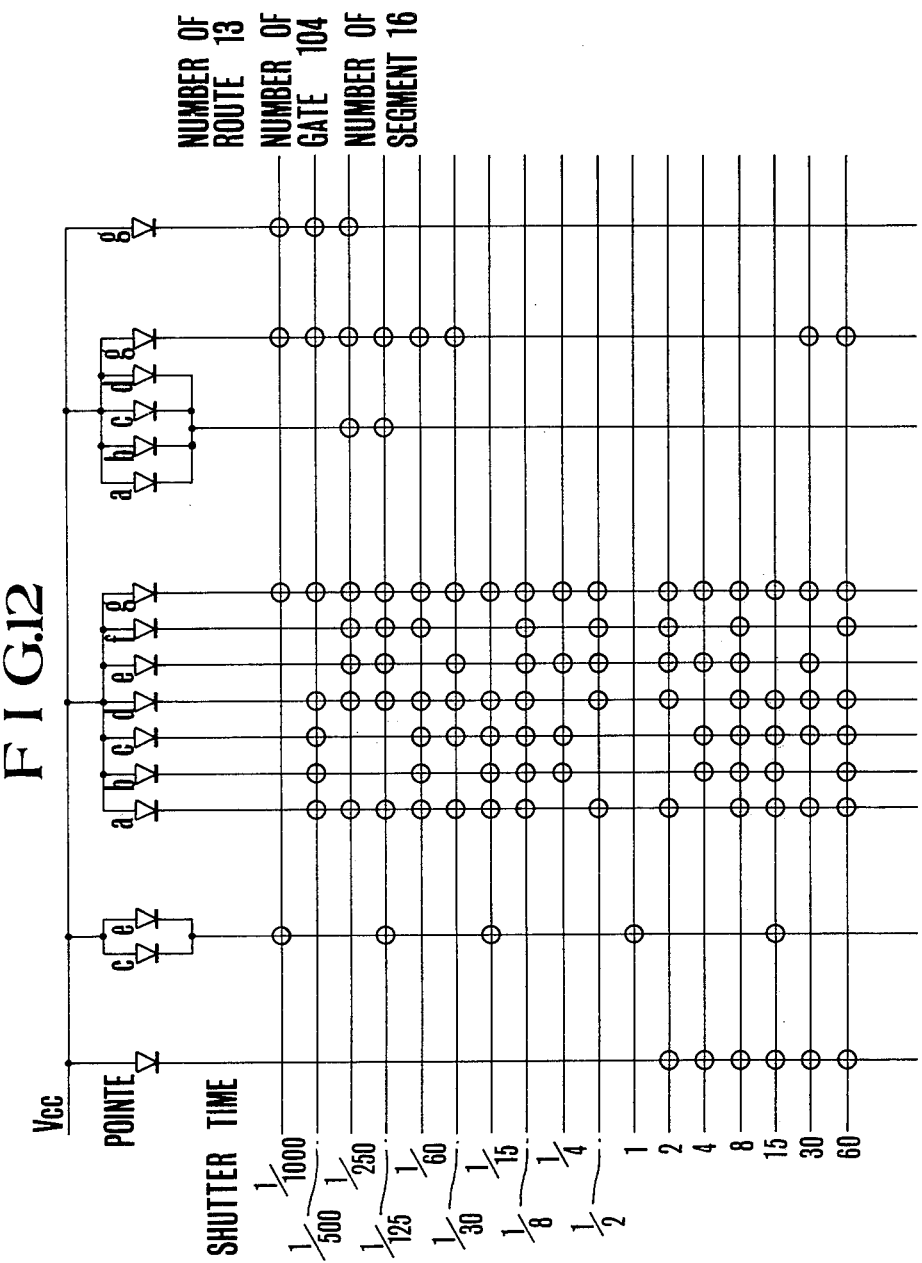
FIG. 12 is a diagram to show fifth example of a shutter time indication circuit.

In the fifth example shown in FIG. 12, the indication of 0 out of the indication of digits is made as "— " for largely reducing the number of indication elements, and the number of lead wires and gates. According to this method, the elements for the third figure is sufficed by what is consolidating a, b, c, d and what is consisting of g only, while the fourth figure is sufficed by the element of g only. Therefore, in this example, the number of input/output lead wires is 13, the number of segments is 16, while the number of gates is 106, thus the number of segments particularly can be largely reduced.

Figure 13:
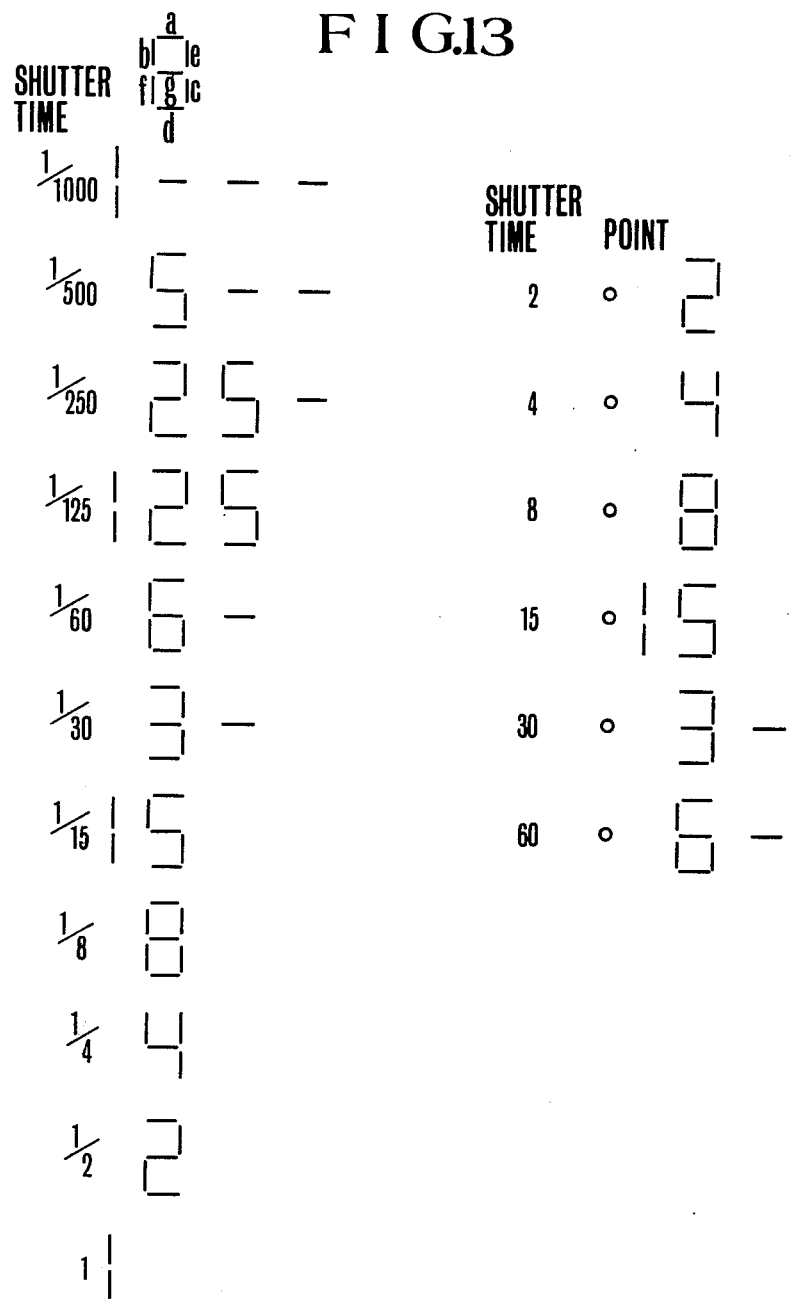
FIG. 13 is a drawing to show the indications by the circuit of FIG. 12.

In the indications of this case, 0 in each of indicated numbers is indicated by "— " as shown in FIG. 13. For further simplifying the circuit of FIG. 12, a sixth example in which a and d are consolidated in the second figure is shown in FIG. 14.

In this case, the elements a and d are consolidated as they are always made ON or OFF commonly, since the indications of 7 and 8 are omitted in the multiple series number indication for shutter time, thus in the example shown in FIG. 14, the number of gates can be reduced to 91 while the number of lead wires to 12, representing some reduction from those in FIG. 12. This method of consolidating a and d in the second figure is also possible in the above mentioned FIG. 6, FIG. 10 and FIG. 12, and by this, the number of lead wires and the number of gates can be reduced without changing the indication positions in each case.

As has been explained above, in the indication system of the present invention, the number of input/output lead wires and others can be largely reduced by composing consolidatedly such indication elements as becoming commonly conducted or non-conducted in correspondence with the photographing information indicated in an indication device consisting of segment elements of a number of figures, and it is convenient for actually mounting the same near a finder of a camera, and its effect is very great in designing and manufacturing of a camera. Also it is not necessary to provide indication elements specially for warning indication for outside of exposure control limit, instead, warning can be made by using illuminant elements for photographing information indication, thus it is advantageous spacewise as the device can be set-up in simple manner, further warning indication can be done distinctively in visual means by flickering, light-out, dimming light, etc.

Further, in a stopped down light measuring system of a shutter preference automatic exposure control camera, the digital diaphragm aperture indication itself of a camera is used and it is possible to indicate appropriate exposure value by lighting, flickering and light-out of fully opened F-value or reference F-value.

What is claimed is:

1. An indication system of a camera comprising:
   means to measure the brightness of an object;
   means to set photographing information;
   operating means coupled to said light measuring means and said photographing information setting means for obtaining an exposure value which corresponds to the output of both said means;
   analog-digital conversion means coupled to said operating means to generate a digital signal which corresponds to the exposure value, wherein said conversion means has a plurality of detection means for a plural number of steps, one of which is placed in an activated state depending on said exposure value;
   a plurality of diode arrays, each one of which is connected respectively to a corresponding one of said detection means;
   an indication means connected to said diode arrays to digitally indicate said exposure value;
   a pulse generation means; and
   an exposure limit signal generation means responsive to said pulse generation means and to the last step of said detection means, wherein said signal generation means generates a signal to control the lighting state of said indication means when the output signals of both said means are supplied to said signal generation means.

2. An indication system according to claim 1, in which said diode arrays comprise a plural number of diodes being connected in parallel, wherein said plural number of diodes and said detection means are connected by one lead wire.

3. An indication system according to claim 2, in which said indication means has a plural number of seven-segment indication elements, which are connected to the said diodes.

4. An indication system according to claim 1, which further comprises another exposure limit signal generation means coupled to the first step of the detection means, wherein said generation means generates a signal to control the lighting state of said indication means when the output signals of both said means are supplied.

* * * * *